United States Patent
Kitcher et al.

(10) Patent No.: US 11,319,105 B2
(45) Date of Patent: *May 3, 2022

(54) CONTAINER WITH SHARPLY OUTLINED INDICIA

(71) Applicant: Owens-Brockway Glass Container Inc., Perrysburg, OH (US)

(72) Inventors: Steve Kitcher, Warrandyte (AU); Stuart Wild, Doreen (AU)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/249,439

(22) Filed: Jan. 16, 2019

(65) Prior Publication Data

US 2019/0152641 A1   May 23, 2019

Related U.S. Application Data

(62) Division of application No. 14/044,981, filed on Oct. 3, 2013, now Pat. No. 10,273,034.

(51) Int. Cl.
| | |
|---|---|
| *B65D 1/02* | (2006.01) |
| *B65D 23/00* | (2006.01) |
| *C03B 9/32* | (2006.01) |
| *C03B 9/347* | (2006.01) |
| *C03B 9/325* | (2006.01) |

(52) U.S. Cl.
CPC ............. *B65D 1/023* (2013.01); *B65D 23/00* (2013.01); *C03B 9/32* (2013.01); *C03B 9/325* (2013.01); *C03B 9/347* (2013.01); *B65D 2203/00* (2013.01)

(58) Field of Classification Search
CPC .... B65D 1/023; B65D 2203/00; B65D 23/14; B65D 1/0223; B65D 23/00; B65D 1/0207; B65D 1/0246; B65D 23/12; B65D 1/40
USPC .......................................................... 220/383
See application file for complete search history.

(56) References Cited

U.S. PATENT DOCUMENTS

| | | | |
|---|---|---|---|
| 1,554,191 A * | 9/1925 | Alexander | B65D 23/14 |
| | | | 40/310 |
| 2,054,553 A | 9/1936 | Ballard | |
| 3,468,648 A | 9/1969 | Nowak | |
| 3,792,988 A | 2/1974 | Nowak et al. | |
| 3,846,103 A | 11/1974 | Rowe | |

(Continued)

FOREIGN PATENT DOCUMENTS

| | | |
|---|---|---|
| DE | 2623812 | 12/1977 |
| EP | 0346792 A1 | 12/1989 |

(Continued)

OTHER PUBLICATIONS

Peruvian Technical Report with English Translation, Serial No. 421, Applicant: Owens-Brockway Glass Container Inc., Dated: Nov. 29, 2019.

(Continued)

*Primary Examiner* — Shawn M Braden

(57) ABSTRACT

A container extends along a longitudinal axis and includes a base, a body extending axially from the base, and a generally radially outwardly facing external surface having sharply outlined indicia. The indicia includes generally V-shaped depressions having outer slopes, inner slopes, and vertices connecting the slopes. A method of making the container is also disclosed.

17 Claims, 12 Drawing Sheets

(56) References Cited

U.S. PATENT DOCUMENTS

| | | | |
|---|---|---|---|
| 4,008,063 A | 2/1977 | Kramer et al. | |
| 4,072,491 A | 2/1978 | Kramer et al. | |
| 4,105,428 A | 8/1978 | Adams | |
| 5,803,289 A * | 9/1998 | Brady | B65D 1/0207 206/459.5 |
| 6,233,973 B1 | 5/2001 | Monchatre | |
| 6,698,440 B2 * | 3/2004 | Beyer | A45B 23/00 135/25.41 |
| 9,150,331 B2 * | 10/2015 | Kisela | B65D 23/14 |
| 9,248,938 B2 * | 2/2016 | Hopps | B65D 41/20 |
| 2003/0168372 A1 | 9/2003 | Headen et al. | |
| 2007/0042684 A1 * | 2/2007 | Park | B65D 23/00 451/29 |
| 2009/0084799 A1 | 4/2009 | Mondon | |
| 2010/0089859 A1 | 4/2010 | Mondon | |
| 2010/0264107 A1 | 10/2010 | Lonsway et al. | |
| 2010/0296273 A1 * | 11/2010 | Lien | G09F 23/06 362/154 |

FOREIGN PATENT DOCUMENTS

| | | |
|---|---|---|
| ES | 2195296 | 12/2003 |
| FR | 2795714 A1 | 1/2001 |
| GB | 1533540 | 11/1978 |
| JP | 360145918 A | 8/1985 |
| JP | 62246830 | 10/1987 |
| JP | 408175824 A | 7/1996 |
| JP | 2010 260764 A | 11/2010 |
| JP | 2010 260765 A | 11/2010 |
| JP | 2011093749 | 5/2011 |
| MX | 2010003196 A | 4/2010 |
| WO | 2009042171 A1 | 4/2009 |

OTHER PUBLICATIONS

Brazilian Office Action with English Translation, Serial No. BR112016007008-9, Applicant: Owens-Brockway Glass Container Inc., dated Jan. 9, 2020.
PCT Search Report and Written Opinion, PCT Serial No. PCT/US2014/054472, PCT Filing Date: Sep. 8, 2014, Applicant: Owens-Brockway Glass Container Inc., dated Nov. 7, 2014.
"Whats New in Glass Might Surprise You", Food and Drug Packaging, Oct. 2006, p. 68-70.
Australian Examination Report No. 2, Application No. 2014329951, Applicant: Owens-Brockway Glass Container Inc., dated Oct. 10, 2018.
Machine Translation of JP2011-093749 Original Publication May 12, 2011.

* cited by examiner

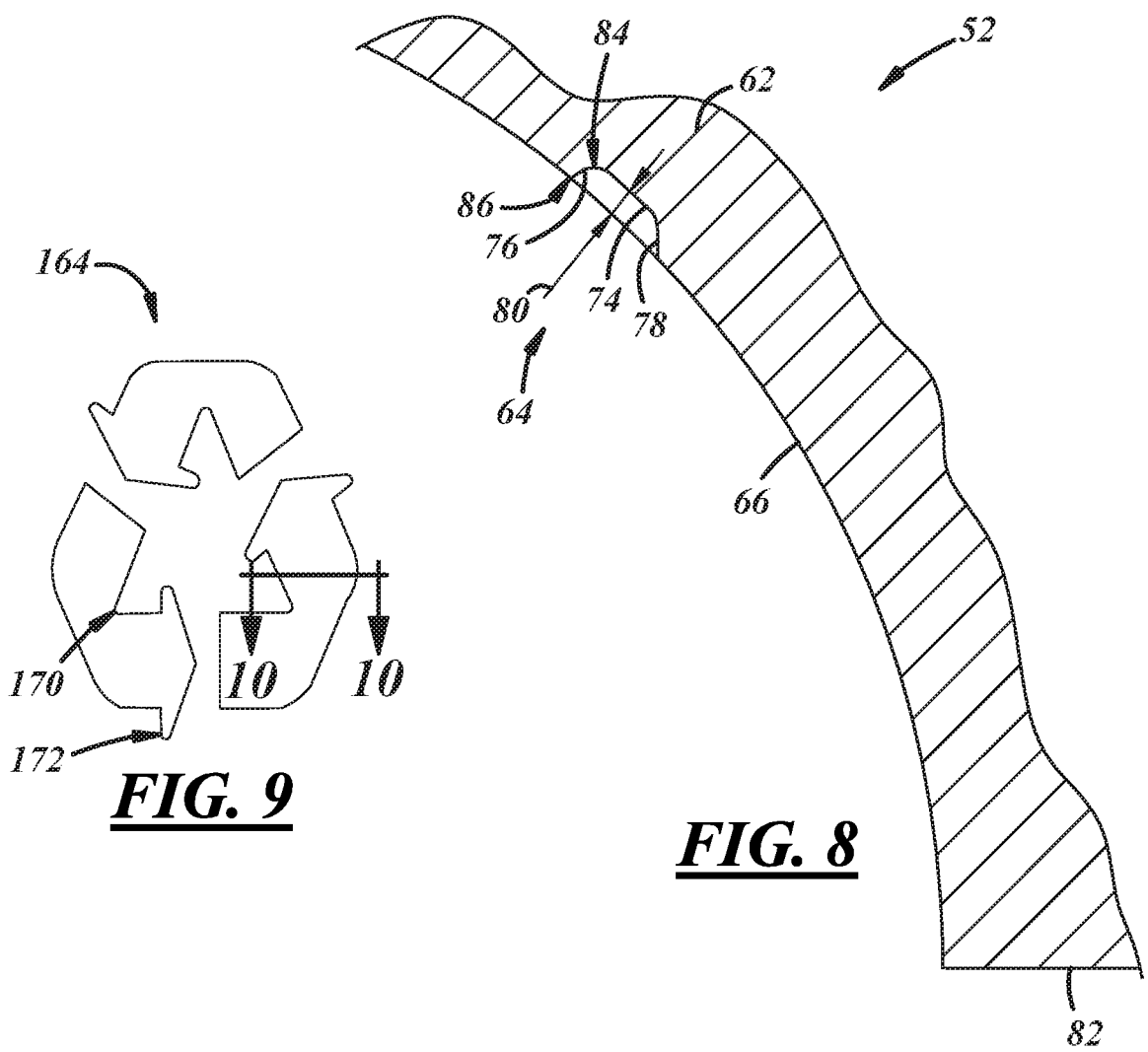
FIG. 9
FIG. 8
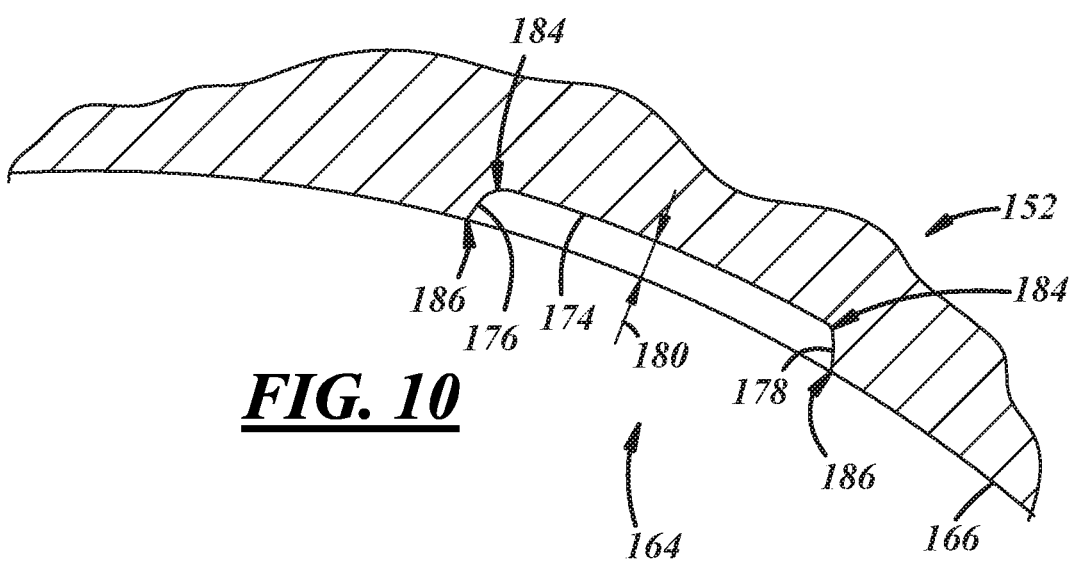
FIG. 10

CONTAINER WITH SHARPLY OUTLINED INDICIA

The present disclosure is directed to containers and, more particularly, to glass containers and related manufacturing methods.

BACKGROUND AND SUMMARY OF THE DISCLOSURE

Bottles typically include a body, a shoulder, a neck, and a neck finish. U.S. Patent Application Publication 2012/0000878 illustrates an example glass bottle of this general type. Such bottles may be produced using a blow-and-blow manufacturing process or a press-and-blow manufacturing process, and typically have substantially uniform wall thicknesses. Moreover, longneck bottles are popular in the beverage packaging industry, particularly for packaging beer. U.S. Patent Application Publication 2010/0264107 discloses production of a longneck bottle by pushing a parison neck against a debossed internal surface of a blank mold to form an external embossment on the parison neck, and then blowing the embossed parison neck against an internal surface of a blow mold to push the external embossment on the neck through the wall of the neck to form an internal embossment in the bottle.

A general object of the present disclosure, in accordance with one aspect of the disclosure, is to provide a container that includes an external surface with sharply outlined indicia.

The present disclosure embodies a number of aspects that can be implemented separately from or in combination with each other.

A container in accordance with one aspect of the disclosure extends along a longitudinal axis and includes a base, a body extending axially from the base, and a generally radially outwardly facing external surface having sharply outlined indicia. The indicia includes generally V-shaped depressions having outer slopes, inner slopes, and vertices connecting the slopes.

In accordance with another aspect of the disclosure, there is provided a method of making a container having a base, a body extending axially from the base, and a generally radially outwardly facing external surface. The method includes forming a parison into conformity with an internal surface of a blank mold having an engraving in the internal surface that forms an embossment on an exterior surface of the parison. The method also includes blowing the parison into conformity with an internal surface of a blow mold to produce a container from the parison, including pushing the embossment against the blow mold internal surface to collapse the embossment into a wall of the container without pushing corresponding material through the wall of the container into an interior of the container.

BRIEF DESCRIPTION OF THE DRAWINGS

The disclosure, together with additional objects, features, advantages and aspects thereof, will be best understood from the following description, the appended claims and the accompanying drawings, in which:

FIG. 8 is an enlarged, fragmentary, cross-sectional view of a portion of the blank mold of FIG. 6, taken along line 8-8 of FIG. 7;

FIG. 9 is an enlarged fragmentary view of an alternative portion of the blank mold of FIG. 6, illustrating a graphic engraving;

FIG. 10 is an enlarged, fragmentary, cross-sectional view of the portion of FIG. 9, taken along line 10-10 of FIG. 9;

DETAILED DESCRIPTION OF PREFERRED EMBODIMENTS

Figure 1:
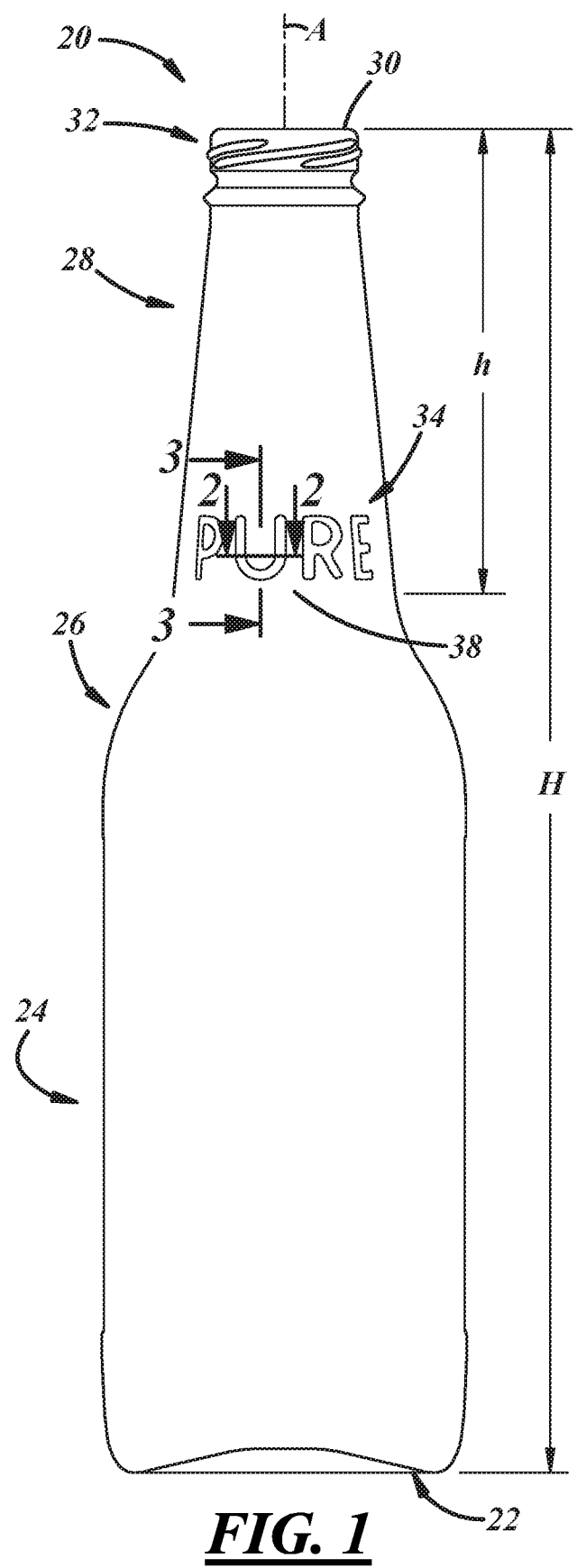
FIG. 1 is an elevational view of a longneck beer bottle having sharply outlined external text, in accordance with an illustrative embodiment of the present disclosure.

FIG. 1 illustrates a container 20, which may be a bottle, extending along a longitudinal central axis A in accordance with one illustrative embodiment of the present disclosure. The container 20 may include a closed base 22, a body 24 extending longitudinally from the base 22 at one end of the body 24, a shoulder 26 extending longitudinally and radially inwardly from another end of the body 24, and a neck 28 extending longitudinally from the shoulder 26 terminating in a lip 30. The container 20 also includes a neck finish 32 axially spaced from the shoulder 26 and terminating the neck 28, and including one or more features for attachment of a desired closure (not shown). In an embodiment, the neck finish may have an external closure diameter of not more than 36 mm.

According to the present disclosure, the container 20 includes integral indicia 34 in an external surface 38 of the container 20. As illustrated in FIG. 1, the indicia 34 includes block text, but also or instead may include cursive text, logos, graphics, or any other markings that may benefit from sharp resolution. As will be described in further detail herein below, the indicia 34 is formed according to a presently disclosed method.

The container 20 may be of any suitable shape and size, may be composed of glass, may be fabricated by press-and-blow and/or blow-and-blow manufacturing operations, or by any other suitable technique(s), and may be used for containing, for example, a beverage, for instance, beer, wine, spirits, soda, or the like, or any other any flowable product. In just one of many potential examples, the container 20 may be a longneck bottle having an overall height H, and the neck 28 (including neck finish 32) having a neck height h. For purposes of the present disclosure, the term "longneck bottle" is defined as a bottle in which the height h of the bottle neck is at least 25% of the overall bottle height H. In illustrative embodiments of the present disclosure, the neck height h is in the range of 33% to 40% of bottle height H. The heights H, h may be measured to the sealing surface or lip 30 that axially terminates the neck 28 and neck finish 32. Also, in one embodiment, the container 20 may be a narrow neck bottle, having a thread diameter (so-called "T" dimension) or a crown diameter (so-called "A" dimension) not more than 38 mm. In other embodiments, the container 20 may be of any suitably sized dimensions. The container 20 is of one-piece integrally formed construction, for, example, of glass, ceramic, metal, or plastic construction. (The term "integrally formed construction" does not exclude one-piece integrally molded layered glass constructions of the type disclosed for example in U.S. Pat. No. 4,740,401, or one-piece glass or metal bottles to which other structure is added after the bottle-forming operation.)

Figure 2:
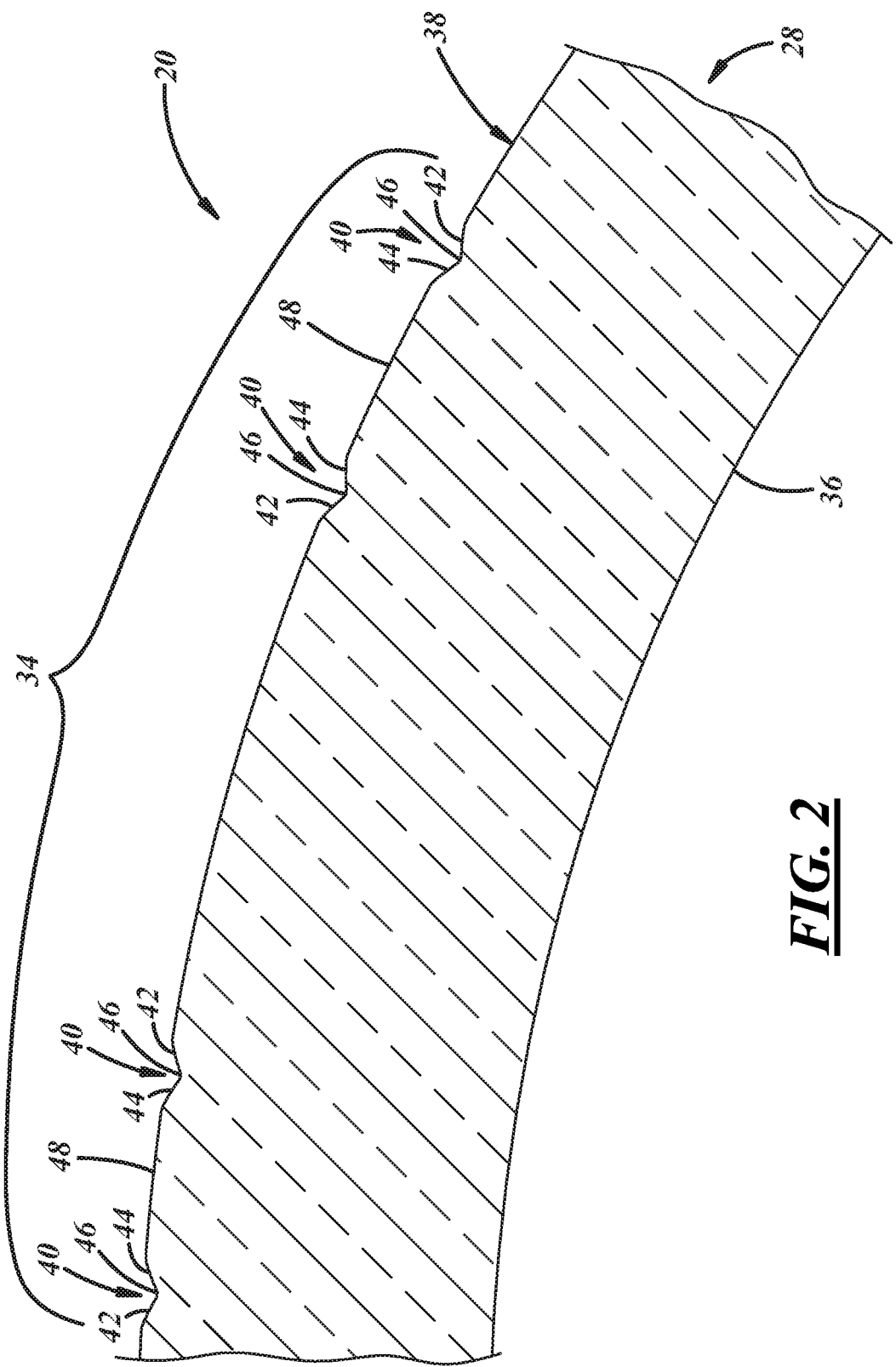
FIG. 2 is an enlarged, fragmentary, transverse cross-sectional view of the bottle of FIG. 1, taken along line 2-2 of FIG. 1.
Figure 3:
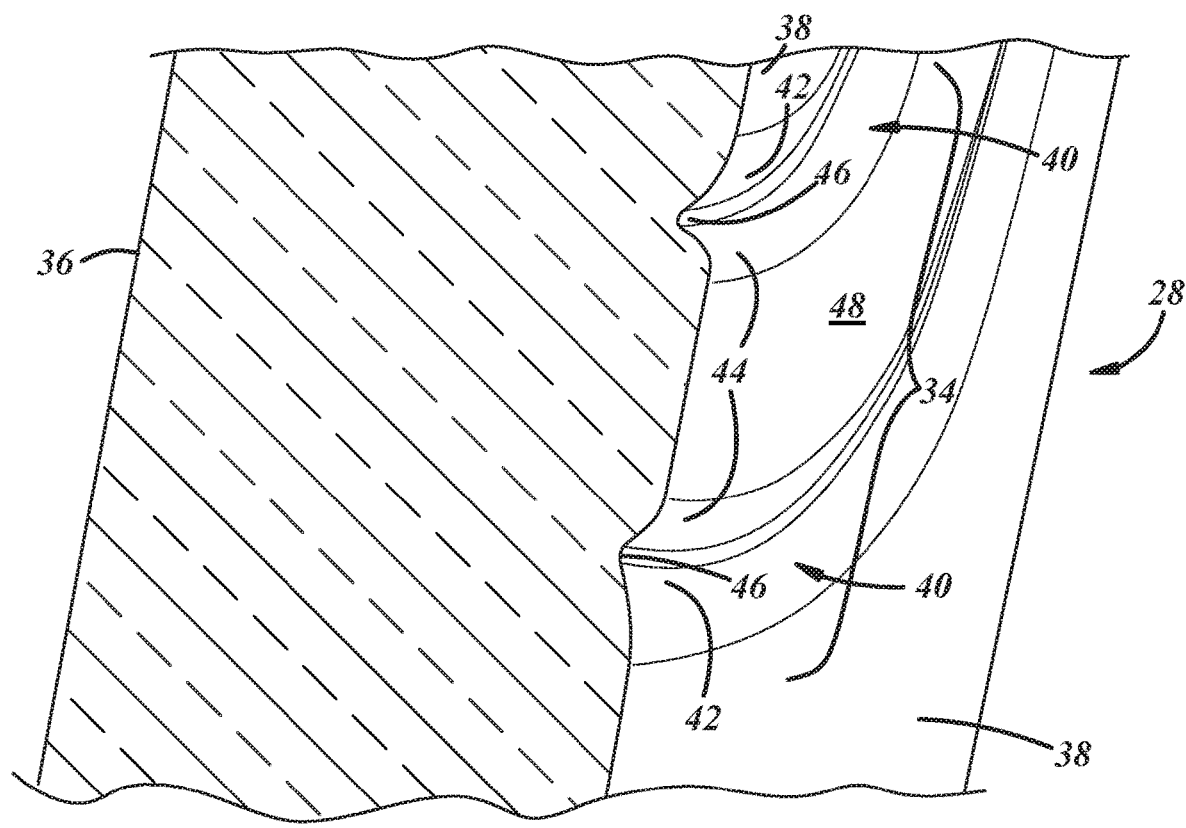
FIG. 3 is an enlarged, fragmentary, longitudinal cross-sectional view of the bottle of FIG. 1, taken along line 3-3 of FIG. 1.

With reference to FIGS. 2 and 3, the container 20 includes a generally radially inwardly facing internal surface 36, and the generally radially outwardly facing external surface 38 in which the indicia 34 is formed. As used herein, the terminology "generally radially" need not be in a direction strictly perpendicular to the axis A of the container 20 and includes a direction at an angle, for example, perpendicular to the exterior surface of the container neck 28.

The indicia 34 includes sharply outlined depressions 40 that may be generally V-shaped in cross section and may be spaced apart and corresponding to one another. For example, the depressions 40 may include first or outer slopes 42, second or inner slopes 44, and nadirs or vertices 46 connecting the slopes 42, 44. The inner slopes 44 are disposed circumferentially and/or axially inwardly of the outer slopes 42. The slopes 42, 44 are disposed at non-radial angles with respect to the container axis A, may be substantially flat or straight, and may, but need not, be symmetrical. Accordingly, the vertices 46 may be sharp lines. In the illustrated example, the width of the depressions 40, for example, in the circumferential direction, may be about 0.2 mm to 0.5 mm including all ranges and subranges therebetween, for example, 0.3-0.4 mm and, more specifically, about 0.35 mm.

The sharpness of the indicia 34 is sharper than can be obtained by blow molding indicia into the exterior of a glass container. Forming of indicia into a surface of a container during a blow molding stage, instead of the blank molding stage, tends to be susceptible to some flowing and leveling of the glass surrounding the indicia, thereby resulting in less sharpness. During development it was discovered that pre-forming the indicia 34 into the external surface of a parison during the blank molding stage tends to result in hardening or solidifying of the glass surrounding the indicia. Surprisingly, the indicia 34 can be somewhat locked into the parison during the blank molding stage to facilitate retention of the indicia 34 through a subsequent blow molding stage.

The indicia 34 also may include lands 48 between the depressions 40 to create outlined indicia, for example, block text. The lands 48 may be substantially equal in outer diameter or size as adjacent or corresponding portions of the container external surface 38. In other words, external surfaces of the lands 48 may be substantially coplanar or otherwise substantially coextensive with corresponding or adjacent portions of the rest of the container external surface 38. As used herein, the terminology "substantially" includes within manufacturing tolerances known to those of ordinary skill in the art.

In contrast to the external surface 38, and in contrast to prior art embossing techniques, the internal surface 36 does not include radially inwardly projecting portions corresponding to the indicia 34. Rather, the internal surface 36 may be substantially cylindrical, or conical (in a conical neck), or at least substantially circular in cross section. As used herein, the terminology "substantially" includes within manufacturing tolerances known to those of ordinary skill in the art.

Also, the container 20 has a radial wall thickness between the internal and external surfaces 36, 38. The depth of the depressions 40 is significantly less than the wall thickness, wherein the indicia 34 affects the container exterior surface 38 but does not protrude, or cause protrusion of material, into the container interior. In the illustrated example, the depth of the depressions may be 0.05 mm to 0.15 mm including all ranges and subranges therebetween, for example, 0.075-0.125 mm and, more specifically, about 0.1 mm, and the wall thickness may be about 2.5 mm to 3.0 mm including all ranges and subranges therebetween, and, more specifically about 2.75 mm. According to the illustrated example, a ratio of the wall thickness (in a region corresponding to the depression) to the depression depth may be greater than 10:1 and, more particularly, may range between 20:1 and 38:1, including all ranges and subranges therebetween, for example, 24:1-34:1 and, more specifically may be about 28:1.

Figure 4:
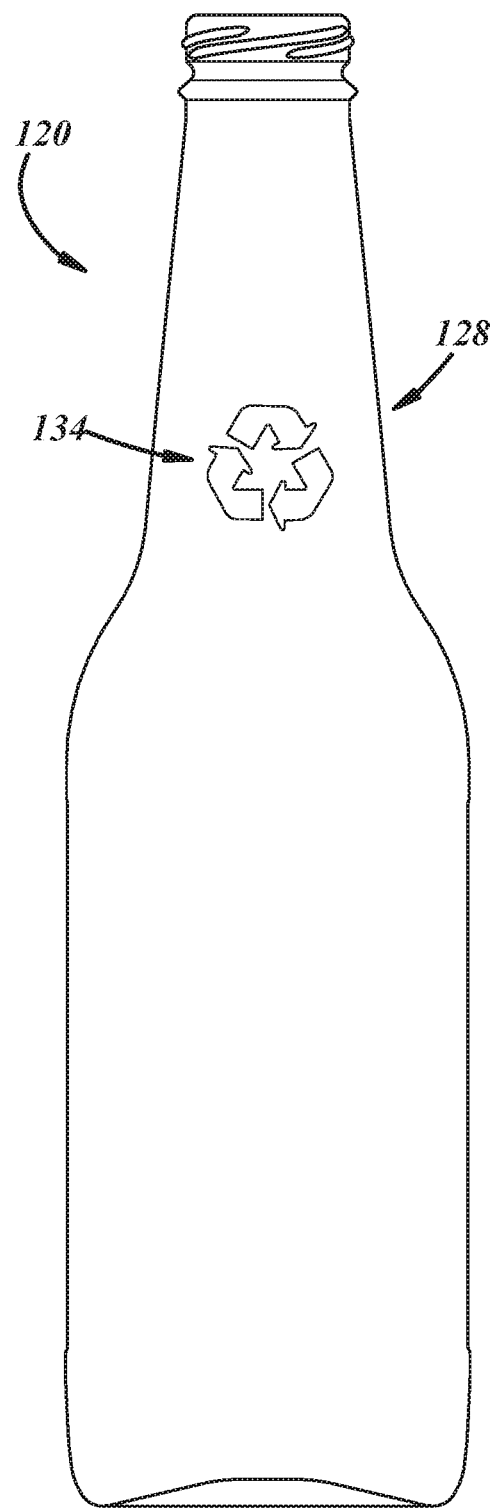
FIG. 4 is an elevational view of a bottle having sharply outlined external graphics, in accordance with another illustrative embodiment of the present disclosure.

FIG. 4 illustrates another illustrative embodiment of a container 120. The container 120 includes integral indicia 134. As illustrated in FIG. 4, the indicia 134 includes a graphical logo and, more particularly, a recycling logo. The indicia 134 may be located on a neck 128 of the container 120 or in any other suitable location of the container 120. This embodiment is similar in many respects to the embodiment of FIGS. 1 through 3 and like numerals between the embodiments generally designate like or corresponding elements throughout the several views of the drawing figures. Accordingly, the descriptions of the embodiments are incorporated into one another, and description of subject matter common to the embodiments generally may not be repeated here.

Figure 5:
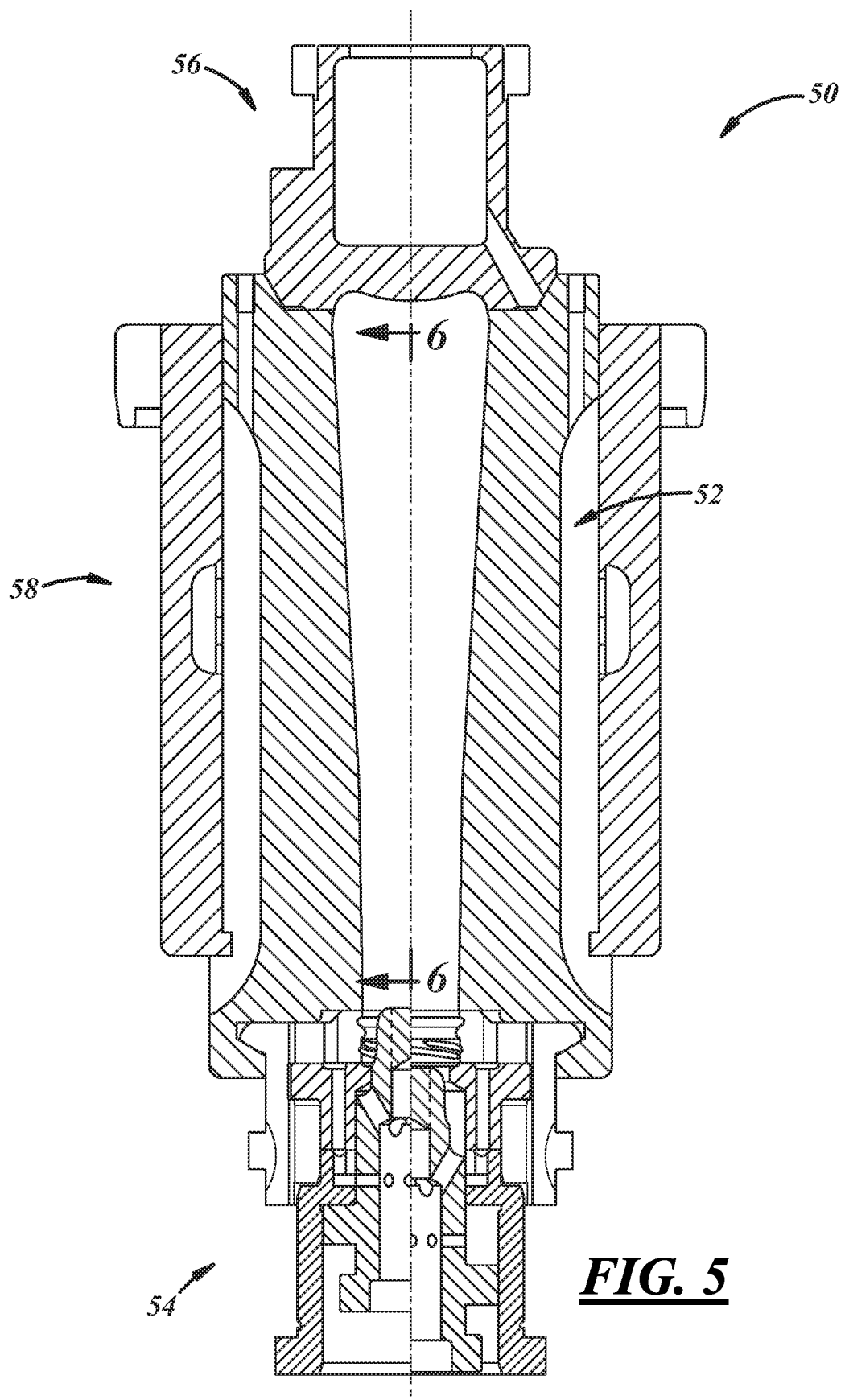
FIG. 5 is a longitudinal cross-sectional view of a blank mold assembly, in accordance with an illustrative embodiment of the present disclosure.

FIG. 5 illustrates an example blank mold assembly 50 that may be used to form a container preform or parison (not shown), which, in turn, may include features used to produce the indicia 34, 134 in the container 20, 120 of FIGS. 1-4. The assembly 50 may include a blank mold 52, a neck ring and plunger assembly 54 at one end of the mold 52, a baffle 56 at another end of the mold 52, and an adaptor and diffuser assembly 58 alongside the mold 52. The illustrated assembly 50 includes a blow-and-blow type of neck ring and plunger assembly 54, but those of ordinary skill in the art would recognize that the assembly 50 could instead include a press-and-blow assembly with a body plunger and the like. To produce a container preform or parison, a charge or gob of molten glass is placed within the blank mold 52 and a plunger and/or blow gas is introduced into the mold 52 to press and/or blow the glass into conformity with the mold components. Thereafter, the plunger and other mold components may be retracted to allow a parison to be removed from the assembly 50 and transferred to a blow mold.

Figure 6:
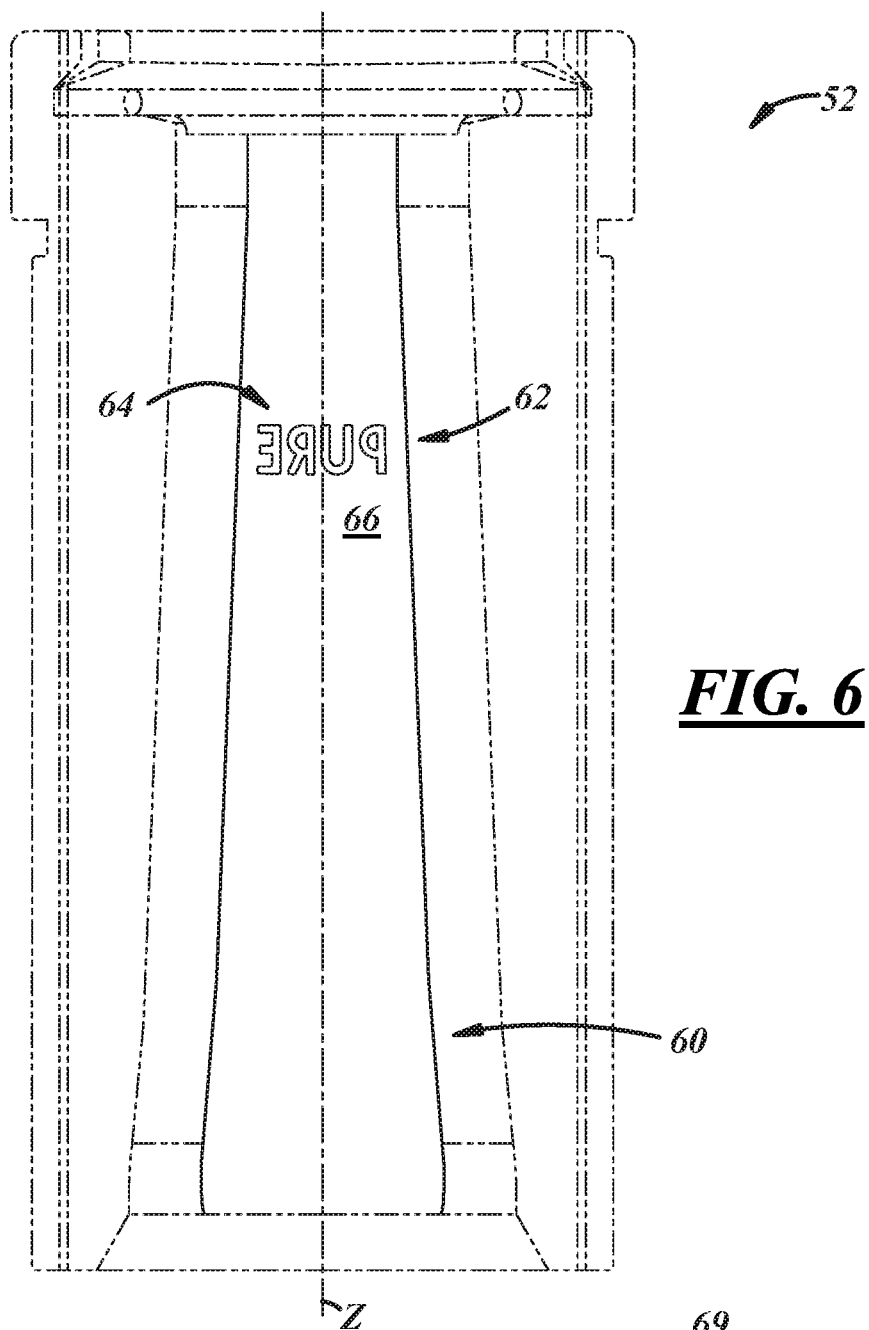
FIG. 6 is an elevational view of a blank mold of the assembly of FIG. 5, taken along line 6 of FIG. 5 and inverted therefrom.

FIG. 6 illustrates the blank mold 52 as including a longitudinal axis Z, a body region 60, and a neck region 62. The mold 52 also includes indicia engraving 64 in an inner surface 66 of the mold 52. In the embodiment illustrated in FIG. 6, the engraving 64 may be located in the neck region 62, but may be located in the body region 60 in other embodiments.

Figure 7:
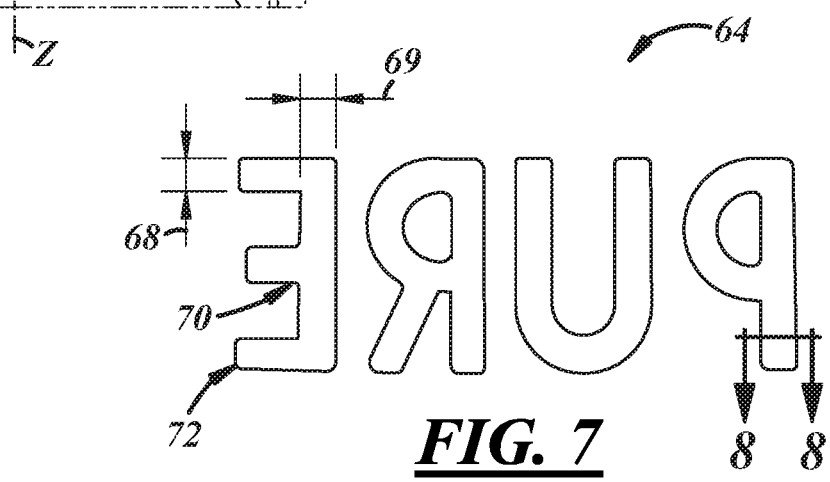
FIG. 7 is an enlarged fragmentary view of an indicia engraving portion of the blank mold of FIG. 6.

FIG. 7 more closely illustrates the engraving 64. The engraving 64 may include block text of one or more letters. In the example illustrated in FIG. 7, the heights of the letters are about 8.7 mm, and widths 68, 69 of the engraving within each letter may be of substantially uniform width. As used in this context, the term "substantially" includes within plus or minus 5%. Also, each letter may include its tightest fillets 70 and rounds 72 (or blends), that may face in longitudinal, circumferential, or both, directions. In the example illustrated in FIG. 7, the fillets 70 and rounds 72 may have radii of about 0.4 mm. As used herein, the term "about" includes within plus or minus 10%.

FIG. 8 shows a portion of the engraving 64 in cross section taken perpendicular to the longitudinal axis Z. The engraving includes a radially outward surface 74 that faces radially inward toward a central longitudinal axis of the mold. The engraving 64 also includes first and second sidewalls 76, 78 circumferentially facing one another and extending between the surface 74 and the internal surface 66 of the mold 52. The surface 74 may be flat or straight, semi-circular, or of any other suitable shape. In the illustrated example, a radial depth 80 of the engraving may be about 0.3 to about 0.4 mm. In other examples, the radial depth 80 may be greater than 0.2 mm to produce acceptable sharply defined indicia and may be less than 0.6 mm to avoid "push-through" of the indicia through the wall of the container.

Example mold inside diameters (IDs), corresponding to the location of the engraving 64, may range between 25 mm and 40 mm. Accordingly, an example ratio of the engraving radial depth 80 to corresponding mold IDs may be between 0.005 and 0.025 and all ranges and subranges therebetween. A more specific range of such a ratio may be between 0.010 and 0.015 and all ranges and subranges therebetween, and, more specifically may be about 0.0125.

Example wall thicknesses of finished containers may range between 1.8 mm and 3.5 mm. Accordingly, an example ratio of the radial depth 80 to the finished container wall thickness (in a region of the container wall corresponding to the depression that corresponds to the engraving) may be between 0.05 and 0.33 and all ranges and subranges therebetween. A more specific range of such a ratio may be between 0.1 and 0.15 and all ranges and subranges therebetween, and, more specifically may be about 0.125.

The sidewall 78 may be disposed circumferentially adjacent a parting line 82 of the mold 52. Thus, the sidewall 78 may be disposed at a suitable draft angle to prevent a mold lock or material tearing condition. A fillet 84 may be provided between the wall 76 and the surface 74. In the illustrated example, the fillet 84 may have a radius between 0.2 mm and 0.4 mm including all ranges and subranges therebetween, for example, 0.25 mm to 0.35 mm and, more specifically about 0.3 mm.

The engraving 64 also includes a blend or a round 86 between the first sidewall 76 and the internal surface 66 of the mold 52. In the illustrated example, the round 86 may have a radius of up to about 0.15 mm. According to the illustrated example, the round 86 may have a radius that is up to about half of the depth 80 of the engraving 64. A similar round may be provided between the sidewall 78 and the internal surface 66. In other examples, the round 86 may have a radius of 0 mm to 0.15 mm. According to the other examples, the ratio of the radius of the round 86 to the engraving depth may be up to about ¼. Unless otherwise specified herein, the term "about" includes consideration of typical manufacturing tolerances for mold design in the art of glass product manufacturing. The round 86 may be produced by a corresponding feature in a cutting tool used to produce the engraving, or a wire brush after the engraving is cut or otherwise produced, or produced in any other suitable manner.

FIG. 9 illustrates another embodiment of an engraving 164. In the example illustrated, the overall height of the logo engraving 164 may be about 18 mm, the overall width may be about 14.7 mm, and widths of the elements of the engraving 164 may range from about 3 mm to about 7 mm. Also, each element of the engraving 164 may include tightest fillets 170 and rounds 172 facing in longitudinal, transverse, or circumferential directions. In the example illustrated in FIG. 9, the fillets 170 may have radii of about 0.1 mm to 0.3 mm and all ranges and subranges therebetween, and, more specifically about 0.2 mm, whereas the rounds 172 may have radii of about 0.3 mm.

FIG. 10 shows a portion of the engraving 164 in cross section taken perpendicular to the longitudinal axis Z. In the illustrated example, a radial depth 180 of the engraving 164 may be about 0.3 to about 0.4 mm. The engraving 164 may be circumferentially centered in the mold 152, and includes a radially outward surface 174, and sidewalls 176, 178 connecting the radially outward surface 174 to an internal surface 166 of the mold 152. The radially outward surface 174 may be flat, semi-circular, or of any other suitable shape. The engraving 164 also includes fillets 184, and blends or rounds 186. In the illustrated example, the fillets 184 may have radii of 0.25 mm to 0.35 mm and all ranges and subranges therebetween, and, more specifically about 0.3 mm, the rounds 186 may be of radii up to 0.15 mm, and the depth 180 may be about 0.3 to about 0.4 mm.

In the embodiments of FIGS. 7-10, the radii of the fillets 84, 184 may be less than the depths 80, 180 of the engravings 64, 164. Likewise, the radii of the rounds 86, 186 may be less than the radii of the fillets 84, 184. Similarly, the depths 80, 180 of the engravings 64, 164 may be greater than the sum of the radii of the fillets 84, 184 and rounds 86, 186, for example, to establish the straight sidewalls 76, 176 and 78, 178.

Figure 11:
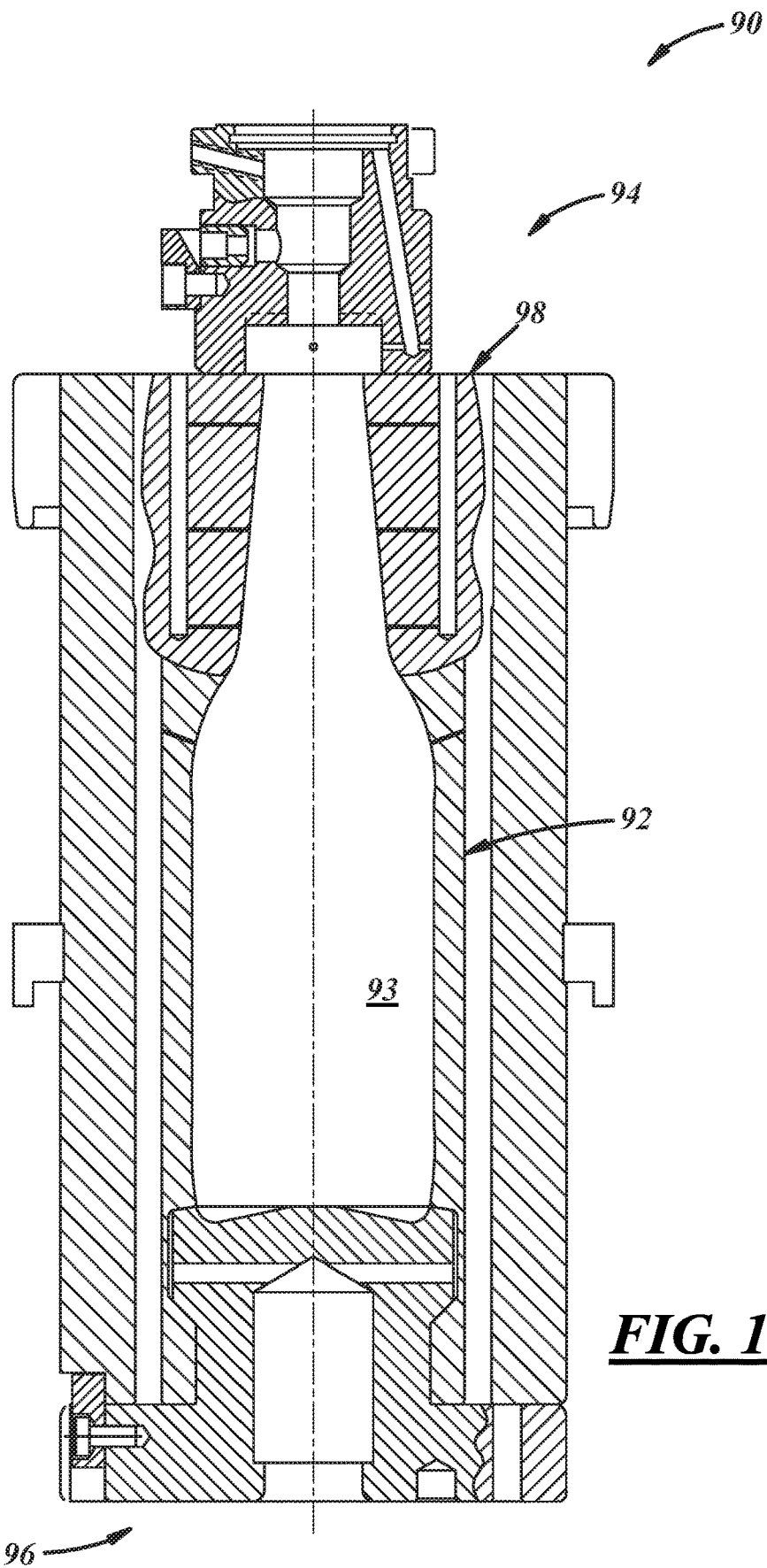
FIG. 11 is a longitudinal cross-sectional view of a blow mold assembly, in accordance with an illustrative embodiment of the present disclosure.

FIG. 11 illustrates an example blow mold assembly 90 that may be used to form the container 20 of FIG. 1 from a parison formed in the blank mold 52 (FIG. 5). The assembly 90 may include a blow mold 92 having an internal surface 93, a blow head 94 at one end of the mold 92, a bottom plate 96 at another end of the mold 92, and a neck insert 98 carried at the blow end of the mold 92. A blow gas is directed through the blow head 94 and into an open end and the interior of the parison to expand the parison into conformity with the blow mold assembly 90. Those of ordinary skill in the art would recognize that a vacuum can be applied to the exterior of the parison to pull the parison into engagement with the mold surfaces.

Figure 12:
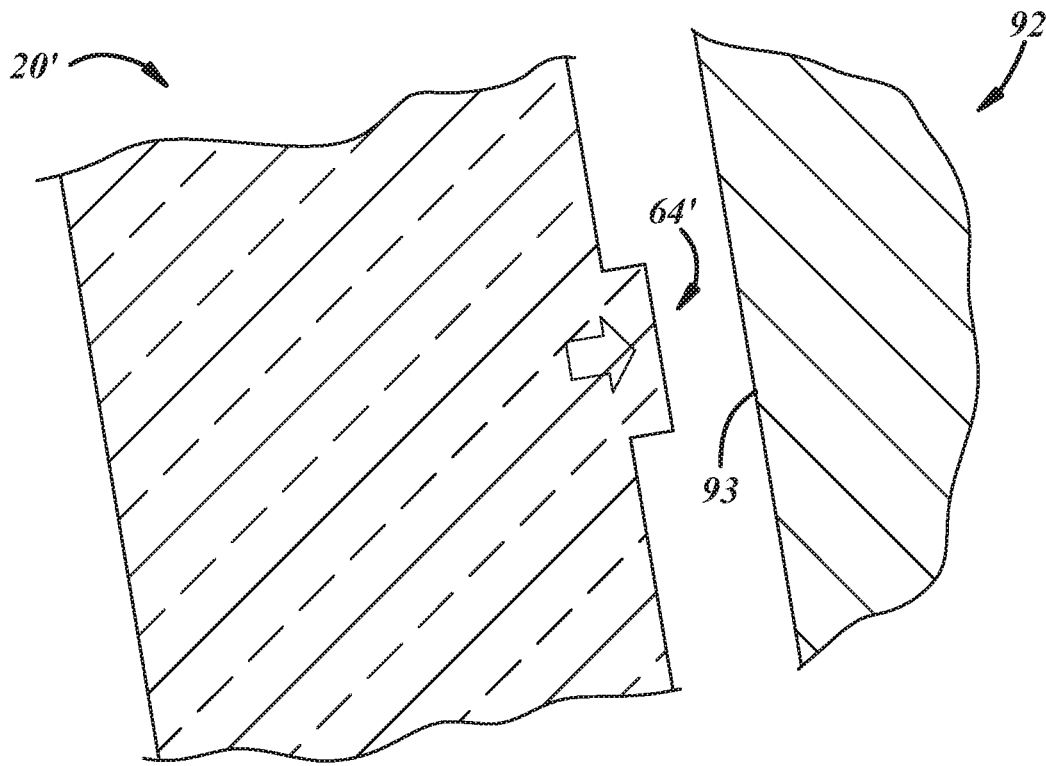
FIG. 12 is an enlarged, fragmentary, schematic, cross-sectional view of a parison wall being blown toward an internal surface of a blow mold of the blow mold assembly of FIG. 11.
Figure 13:
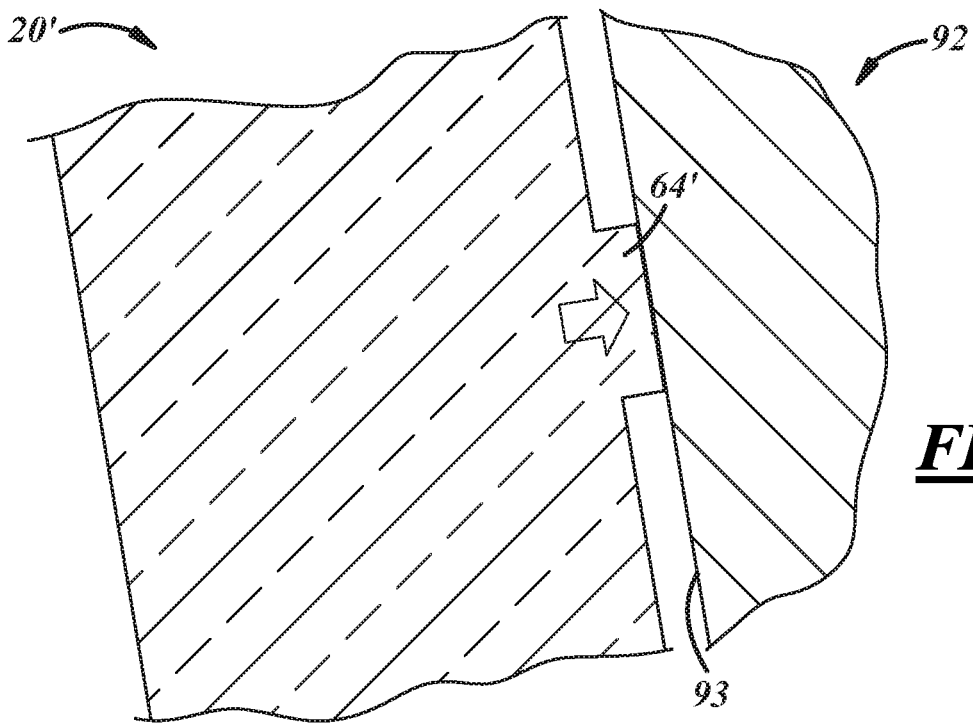
FIG. 13 is an enlarged, fragmentary, schematic, cross-sectional view of a parison wall being blown into contact with an internal surface of a blow mold of the blow mold assembly of FIG. 11.
Figure 14:
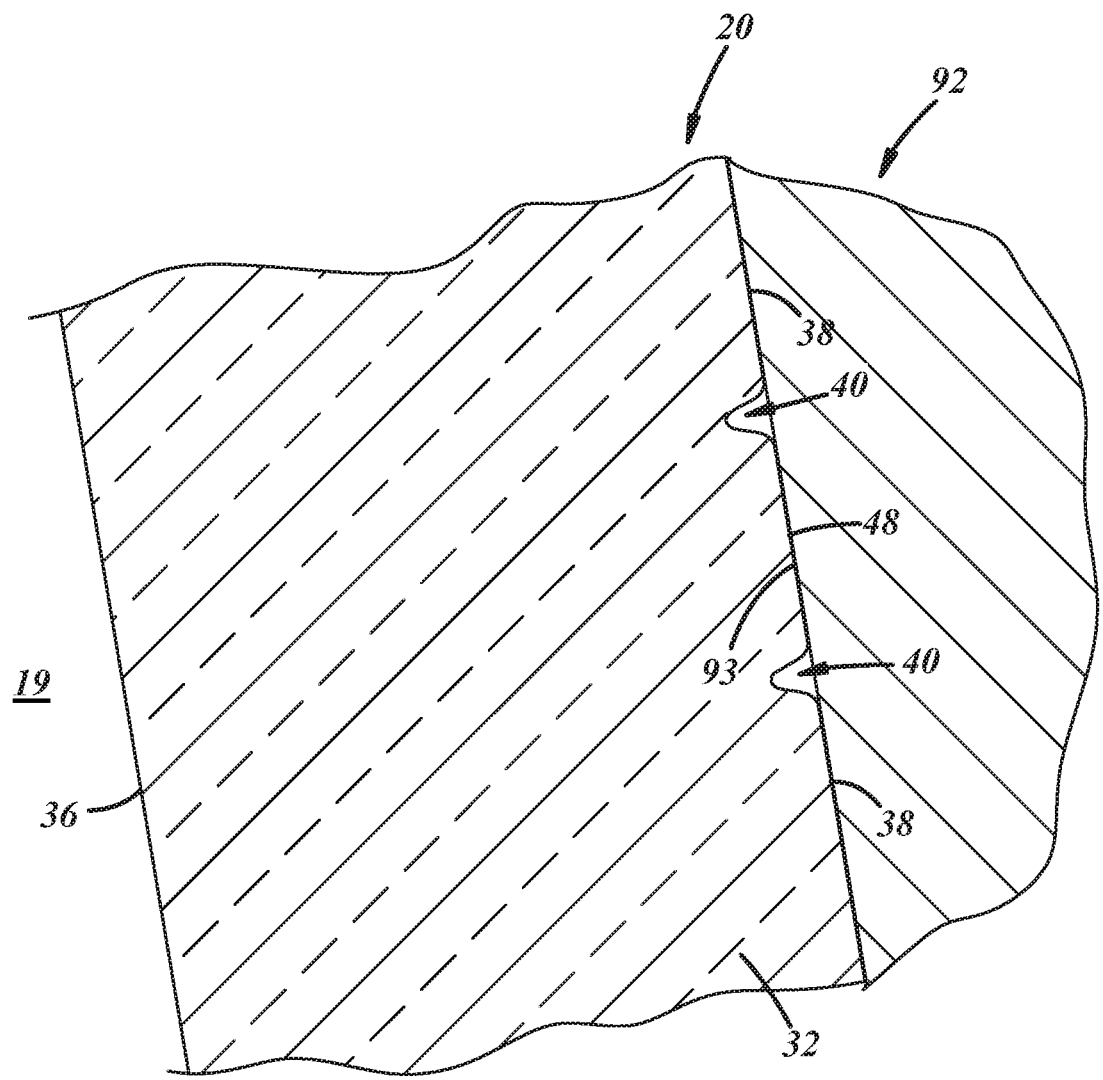
FIG. 14 is an enlarged, fragmentary, schematic, cross-sectional view of the parison blown against the internal surface of the blow mold of FIG. 11 to create a container, and illustrating a parison embossment pushed into an exterior surface of a container wall but not through the container wall.

FIGS. 12-14 illustrate, schematically, a portion of the blow mold 92 of FIG. 11 and the parison 20' including an embossment 64' produced by the engraving 64 of the blank mold 52 of FIGS. 5-8. The parison 20' is blown so as to expand outwardly toward the blow mold 92 as shown in FIG. 12, and so as to drive the embossment 64' into contact with the internal surface 93 of the blow mold 92 as shown in FIG. 13. The parison 20' is further blown so as to further drive other portions of the parison 20' around the embossment 64' into contact with the internal surface 93 of the blow mold 92 as shown in FIG. 14 to form the container 20 having the container external surface 38 with the sharply outlined indicia 34 (FIG. 1). Accordingly, the blow mold 92 acts to impress or stamp the embossment 64' into the wall thickness of the container 20. Because the embossment 64' may be somewhat hardened or solidified from being pre-formed in the parison 20', the embossment 64' tends to retain its form but buckle or collapse into the wall of the container 20, to form the spaced apart depressions 40 and the lands 48, but without pushing corresponding material through the wall of the container 20 into an interior 19 of the container 20 without affecting the interior surface 36 of the container 20. In other words, the embossment 64' is completely absorbed by the wall thickness of the container 20. Notably, as illustrated, the outer diameter or surface of the lands 48 may be coplanar or coincident with the surrounding portions of the external surface 38. In other words, the lands 48 need not protrude radially outwardly from the surface 38 and need not be recessed with respect to the surface 38.

Figure 15:
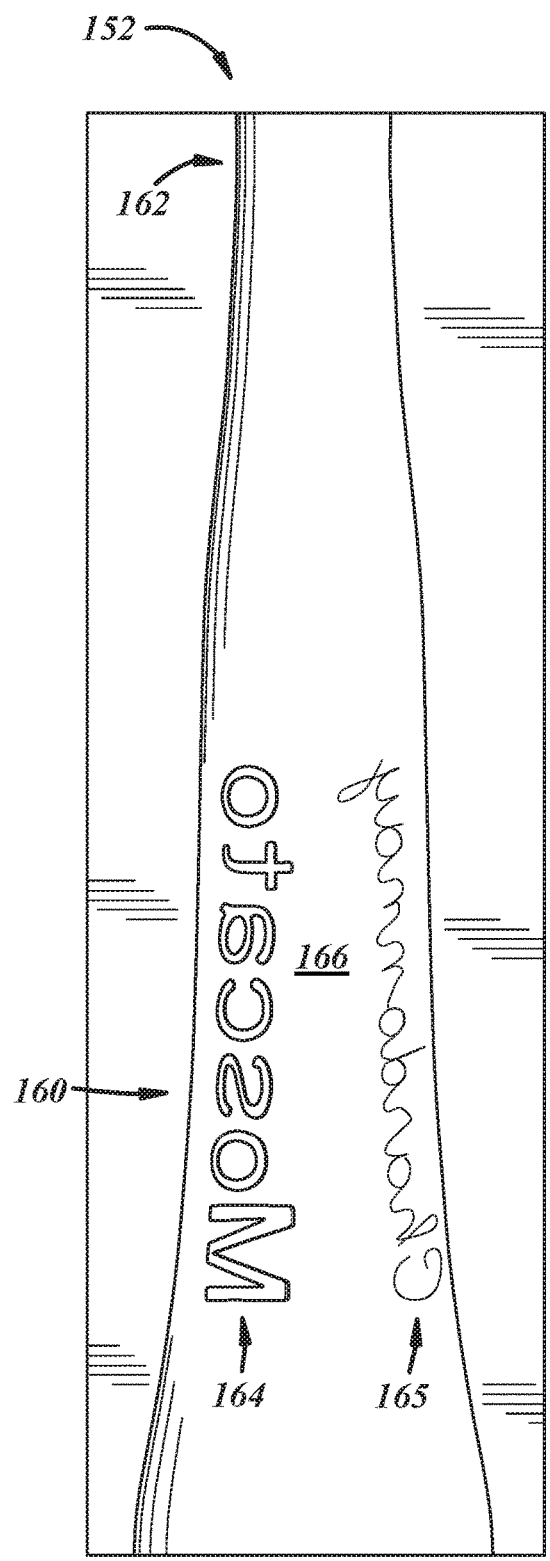
FIGS. 15 and 16 are elevational views of a blank mold bodies for producing a parison for a wine bottle, and including block text and cursive text engravings.
Figure 16:
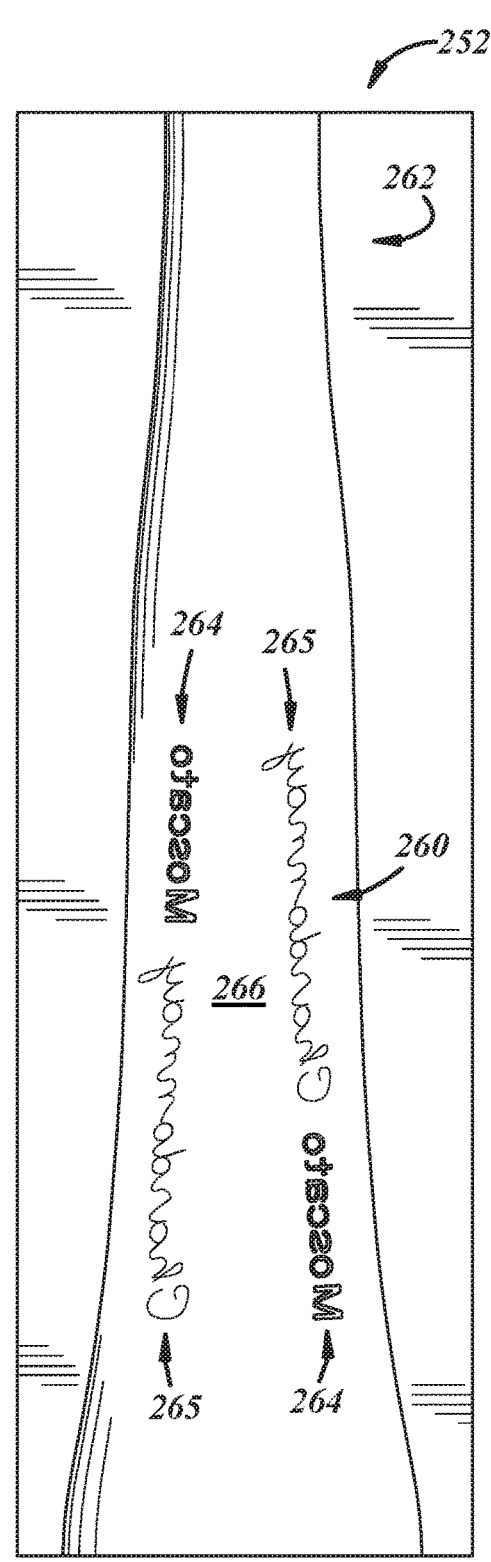
Figure 17:
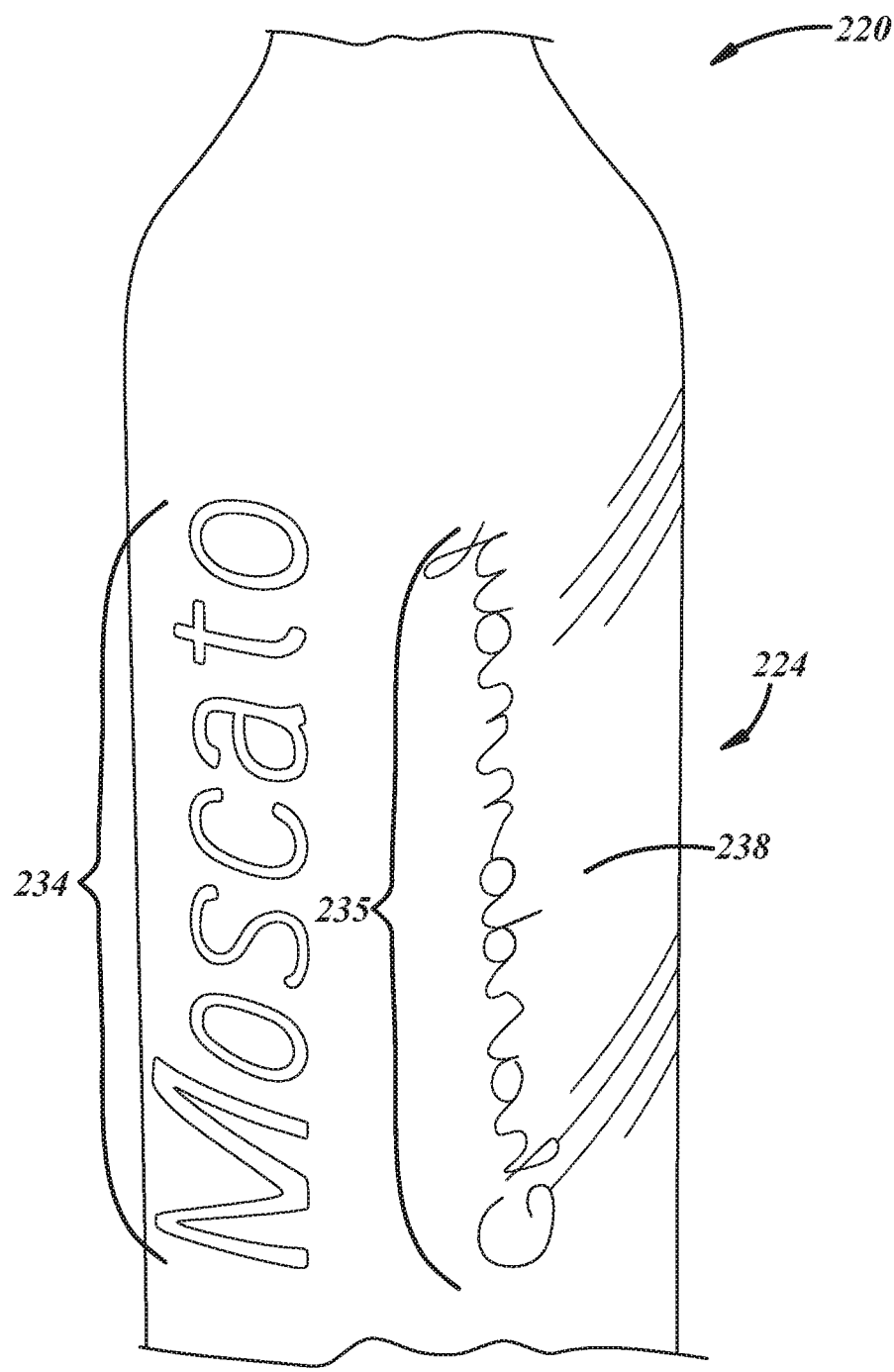
FIG. 17 is a fragmentary elevational view of a wine bottle produced by the blank mold body of FIG. 15 and illustrating sharply outlined block text in a front surface of the bottle and sharply outlined cursive text in a rear surface of the bottle.

FIGS. 15 through 17 show another illustrative embodiment according to the present disclosure. This embodiment is similar in many respects to the embodiments of FIGS. 1 through 14 and like numerals between the embodiments generally designate like or corresponding elements throughout the several views of the drawing figures. Accordingly, the descriptions of the embodiments are incorporated into one another, and description of subject matter common to the embodiments generally may not be repeated here.

With reference to FIG. 15, a blank mold 152 includes a body portion 160 and a neck portion 162, and an internal surface 166. The internal surface 166 at the body portion 160 includes a first indicia engraving 164 of block text and a second indicia engraving 165 of script text.

Similarly, with reference to FIG. 15, a blank mold 252 includes a body portion 260 and a neck portion 262, and an internal surface 266. The internal surface 266 at the body portion 260 includes first sets of indicia engraving 264 of block text and second sets of indicia engraving 265 of script text.

In either case, and with reference to FIG. 17, the presently disclosed apparatus, process, and dimensional teachings may be used to produce a container 220 from the parison formed in the blank mold 152 (FIG. 15), having a body 224 with sharply outlined indicia 234, 235 in an external surface 238 of the body 224. Those of ordinary skill in the art recognize that a parison may stretch during manufacturing, particularly when being transferred from a blank mold to a blow mold. Accordingly, it is believed that producing the indicia 234 in a container body may involve some application-specific adjustments to be made to the engraving geometry to account for such stretching. For example, some engraving geometry may need to be compressed to compensate for elongation of the embossment features in the parison due to parison stretching. Nevertheless, the presently disclosed methods will be able to be used to produce the sharply outlined indicia of the present disclosure in container bodies.

The present disclosure provides an advancement in the art. Conventionally, it has been understood that subtle but sharply outlined indicia was not possible to produce in exterior surfaces of glass containers. In fact, it is well known that it is impossible to achieve such sharpness using engravings in a blow mold. Prior approaches to embossing containers result in embossments protruding radially outwardly from outer surfaces of containers and/or radially inwardly from inner surfaces of containers and, in any case, such embossments formed in such manner are not sharply defined. Contrary to such conventional wisdom, it is now possible to produce sharply outlined indicia, without using such blow mold engravings and without pushing material through a wall of the container. Accordingly, the presently disclosed method involves use of tools having structure and function significantly different from that of the prior art and, concomitantly, the method provides significantly different results. Likewise, the presently disclosed products involve structural elements whose function is significantly different from that of the prior art and, concomitantly, the products provide significantly different results. The present disclosure provides a simple but elegant solution to a problem in the art of glass container manufacturing that has long been experienced but apparently unappreciated.

There thus has been disclosed a container that fully satisfies all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A container extending along a longitudinal axis and that includes, a base; a body extending axially from the base; and a generally radially outwardly facing external surface having sharply outlined indicia including generally V-shaped depressions having outer slopes, inner slopes, and vertices connecting the slopes, wherein the indicia is at least one of text or a logo, wherein the indicia includes lands between the depressions and having external surfaces substantially coextensive with the container external surface.

2. The container set forth in claim 1, wherein the indicia is located in at least one of the neck or the body.

3. The container set forth in claim 1, wherein the depressions are about 0.2-0.5 mm in width and about 0.05-0.15 mm in depth, and a corresponding wall thickness of the container is about 1.8-3.5 mm.

4. The container set forth in claim 1, wherein the container also includes an interior surface corresponding to and opposite of the external surface, wherein the interior surface includes no push-through from the indicia.

5. The container set forth in claim 1, wherein the depressions are about 0.3-0.4 mm in width and about 0.075-0.125 mm in depth.

6. The container set forth in claim 1, wherein a ratio of the wall thickness to the depression depth ranges between 20:1 and 38:1.

7. The container set forth in claim 1, wherein the indicia is located proximal with respect to a shoulder of the container and distal with respect to a neck finish of the container.

8. The container set forth in claim 1, wherein a ratio of the wall thickness to the depression depth ranges between 24:1 and 34:1.

9. The container set forth in claim 1, wherein the indicia includes collapsed embossments in and integral with the generally radially outwardly facing external surface.

10. A container extending along a longitudinal axis and that includes,
- a base;
- a body extending axially from the base;
- a generally radially inwardly facing internal surface;
- a generally radially outwardly facing external surface having sharply outlined molded indicia therein and integral therewith; and
- a wall thickness between the internal and external surfaces, wherein the indicia includes collapsed embossments completely absorbed by the wall thickness and including generally V-shaped depressions having outer slopes, inner slopes, and vertices connecting the slopes.

11. The container set forth in claim 10, wherein the indicia is at least one of text or a logo located in a neck of the container and proximal with respect to a shoulder of the container and distal with respect to a neck finish of the container.

12. The container set forth in claim 10, wherein the depressions are about 0.2-0.5 mm in width and about 0.05-0.15 mm in depth, and a corresponding wall thickness of the container is about 1.8-3.5 mm.

13. The container set forth in claim 10, wherein the internal surface includes no push-through from the indicia.

14. The container set forth in claim 10, wherein the depressions are about 0.3-0.4 mm in width and about 0.075-0.125 mm in depth.

15. The container set forth in claim 10, wherein a ratio of the wall thickness to the depression depth ranges between 20:1 and 38:1.

16. The container set forth in claim 10, wherein a ratio of the wall thickness to the depression depth ranges between 24:1 and 34:1.

17. The container set forth in claim 10, wherein the indicia includes lands between the depressions and having external surfaces substantially coextensive with the container external surface.

* * * * *